US008755592B2

(12) United States Patent
Lim et al.

(10) Patent No.: US 8,755,592 B2
(45) Date of Patent: Jun. 17, 2014

(54) STEREO MATCHING SYSTEM USING DYNAMIC PROGRAMMING AND METHOD THEREOF

(75) Inventors: Eul Gyoon Lim, Daejeon (KR); Ji Ho Chang, Gyeonggi-do (KR); Jae Il Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 364 days.

(21) Appl. No.: 13/324,456

(22) Filed: Dec. 13, 2011

(65) Prior Publication Data

US 2012/0163703 A1 Jun. 28, 2012

(30) Foreign Application Priority Data

Dec. 23, 2010 (KR) ........................ 10-2010-0134085

(51) Int. Cl.
*G06K 9/36* (2006.01)
*G06T 15/00* (2011.01)

(52) U.S. Cl.
USPC .......................................................... 382/154

(58) Field of Classification Search
None
See application file for complete search history.

(56) References Cited

U.S. PATENT DOCUMENTS 7,295,697 B1 * 11/2007 Satoh ............................ 382/154

FOREIGN PATENT DOCUMENTS

KR 10-0374784 B1 2/2003

OTHER PUBLICATIONS

Torr et al., "Dense stereo using pivoted dynamic programming", Elsevier, Image and Vision Computing 22 (2004), pp. 795-806.*

Liang Wang et al., "High-quality Real-time Stereo using Adaptive Cost Aggregation and Dynamic Programming", Proceedings of the Third International Symposium on 3D Data Processing, Visualization, and Transmission (3DPVT'06) 0-7695-2825-2/06, 2006, 8 pages total.*

Hirschmuller et al., "Accurate and Efficient Stereo Processing by Semi-Global Matching and Mutual Information", IEEE Conference on Computer Vision and Pattern Recognition (CVPR), San Diego, CA, USA, Jun. 20-26, 2005, 8 pages total.*

A. Criminisi, et al; Efficient Dense Stereo with Occlusions for New View-Synthesis by Four-State Dynamic Programming; Intl. Journal on Computer Vision (IJCV), Jan. 2007, pp. 1-23.

Liang Wang, et al; "High-quality Real-time Stereo using Adaptive Cost Aggregation and Dynamic Programming", Proceedings of the Third International Symposium on 3D Data Processing, Visualization and Transmission (3DPVT'06) Jun. 14-16, 2006, pp. 798-805, Chapel Hill, NC.

Hong Jeong, et al; "Fast Stereo Matching Using Constraints in Discrete Space", IEICE Trans. Inf & Syst. vol. E83-D, No. 7, Jul. 2000, pp. 1592-1600.

* cited by examiner

*Primary Examiner* — Brian P Werner
(74) *Attorney, Agent, or Firm* — Ladas & Parry LLP

(57) ABSTRACT

Disclosed is a stereo matching system and method using a dynamic programming scheme. The stereo matching system and method using a dynamic programming scheme according to the present invention may perform viterbi type stereo matching using at least two different penalty of disparity discontinuity (PD) values and synthesize the performed stereo matching results, thereby outputting a disparity map.

14 Claims, 9 Drawing Sheets

$L_1 : x = 0$
$L_2 : z - 0 = \dfrac{-f}{d \cdot \omega}(x - B)$ $\omega$ : pixel width
$f$ : focal length
$B$ : baseline
$d$ : disparity in pixel unit
$z$ : depth (a)        (b)

(a)

(b)

(c)

(a)

| RED= $D_{5\%}(y,x)$ | | | | | | | | GREEN= $D_{10\%}(y,x)$ | | | | | | | | BLUE= $D_{20\%}(y,x)$ | | | | | | | |
|---|---|---|---|---|---|---|---|---|---|---|---|---|---|---|---|---|---|---|---|---|---|---|---|
| b7 | b6 | b5 | b4 | b3 | b2 | b1 | b0 | b7 | b6 | b5 | b4 | b3 | b2 | b1 | b0 | b7 | b6 | b5 | b4 | b3 | b2 | b1 | b0 |

(b)

STEREO MATCHING SYSTEM USING DYNAMIC PROGRAMMING AND METHOD THEREOF

CROSS-REFERENCE TO RELATED APPLICATIONS

This application claims priority to and the benefit of Korean Patent Application No. 10-2010-0134085 filed in the Korean Intellectual Property Office on Dec. 23, 2010, the entire contents of which are incorporated herein by reference.

TECHNICAL FIELD

The present invention relates to a stereo matching system, and more particularly, to a stereo matching system and method using a dynamic programming scheme that may perform viterbi type stereo matching using at least two different penalty of disparity discontinuity (PD) values and synthesize the performed stereo matching results, thereby outputting a disparity map.

BACKGROUND

An intelligent robot needs distance information to recognize a position of an obstacle or a gesture of a human being. A technology of obtaining distance information from an image using two cameras is generally referred to as a stereo matching technology.

A correspondence relationship issue of finding a matching point between two images of the same scene in stereo matching belongs to the most important operation in a stereo calculation. A principle thereof will be briefly described.

FIG. 1 is an example diagram illustrating pinhole cameras to describe binocular disparity in a general parallel axis stereo camera according to the prior art.

As shown in FIG. 1, for example, in the case of a point on a Z axis, an image is focused on a center of a sensor plane of a left camera. However, in a sensor plane of a right camera, an image is focused at a position separate away from the center by d·ω. In a right camera image, an image is focused at a position separate away from the center by d. Here, a value of d is referred to as binocular disparity and can be calculated by intersecting point between two straight lines $L_1$ and $L_2$ and thus, is a function of a focal length (f) of two cameras, a distance (B) between the two cameras, a pixel width (ω) of sensors, and a distance (z) from a camera pinhole to a subject. Like this, when an image is obtained using the two cameras, a single object exists at different positions in two images due to a position difference between the two cameras.

By inversely using the above characteristic, when a disparity (d) of one object is known, a distance from the object can be known.

A stereo matching system of calculating binocular disparity information using images input from two cameras may be classified into a local approach, a global approach, a semi-global approach, and the like. Here, the semi-global approach performs one dimensional (1D) energy optimization and thus, can be configured as hardware such as an application specific integrated circuit (ASIC) and the like. Therefore, the semi-global approach is the most widely used scheme.

In the semi-global approach, a stereo matching technology based on a viterbi algorithm determines an increase, a decrease, or maintenance in a binocular disparity value between adjacent pixels using various lattice structures. A penalty of disparity discontinuity (PD) value is used for a process of determining the increase, the decrease, or the maintenance in the binocular disparity value. The PD value indicates a kind of penalty value to prevent a path from being connected from one node to another node having a different binocular disparity value level.

A change in a disparity map according to a magnitude of the PD value will be described based on a lattice structure disclosed in the following [Reference 1]. Initially, an image as shown in FIG. 2 is used as a reference image.

[Reference 1] Hong JEONG and Yuns OH, "Fast Stereo Matching Using Constraints in Discrete Space", IEICE TRANS. INF. & SYST. VOL. E83-D, No. 7 Jul. 2000.

FIG. 2 is an example color diagram illustrating a stereo image obtained using the cameras of FIG. 1.

Referring to FIG. 2, as the reference image, a picture (a) indicates an image photographed from the left camera and a picture (b) indicates an image photographed from the right camera.

FIG. 3 is a first example color diagram to describe a change in a disparity map according to a magnitude of a PD value according to the prior art.

As shown in FIG. 3, when the PD value is less than a change in a cost value in an object boundary at all times, an increase and a decrease in disparity occurs in the object boundary and thus, the object may be identified on the disparity map. When the PD value is greater than the change in the cost value within the object, the increase and the decrease in the disparity do not occur within the object and thus, a phenomenon that the object becomes flat occurs.

Here, a picture (a) corresponds to the disparity map and a line on the disparity map corresponds to a reference line of picture (b) to graph (e). The picture (b) indicates P(i,j) of the line corresponding to the reference line and a binocular disparity value increases from bottom to top. A picture (f) is an enlarged picture to describe the picture (b). Here, white nodes are P(i,j)=1 and nodes that are selected to increase the disparity during a backward processing process, and black nodes are P(i,j)=−1 and nodes that are selected to decrease the disparity during the backward processing process. Gray nodes are P(i,j)=0 and nodes that are selected to maintain the disparity during the backward processing process. That is, a left binocular disparity value of a white node is greater than a binocular disparity value of the white node by 1, a left binocular disparity value of a gray node is equal to a binocular disparity value of the gray node, and a left binocular disparity value of a black node is less than a binocular disparity value of the black node by 1. The graph (c) shows an intensity profile of a right matching line and the graph (e) shows an intensity profile of a left matching line. The graph (d) is a visualized graph showing how points of the graphs (c) and (e) are matched.

FIG. 4 is a second example color diagram to describe a change in a disparity map according to a magnitude of a PD value according to the prior art. The PD value used here is ¼ of the PD value used in FIG. 3.

When the PD value is significantly small, a change in disparity easily occurs. In a forward process, a cost of a path in which the binocular disparity increases may be equal to a cost of a path in which the binocular disparity decreases. When the path in which the binocular disparity decreases is configured to be selected for every such case, and a disparity map is calculated by applying a low PD value for each case, a disparity map in which an inside of an object is empty is obtained as shown in FIG. 4. Here, when the PD value is less than a change in a cost value due to noise, the increase or the decrease in the disparity may also occur due to noise.

FIG. 5 is a third example color diagram to describe a change in a disparity map according to a magnitude of a PD value according to the prior art. The PD value used here is about two folds of the PD value used in FIG. 3 and binocular disparity of an end portion of a hand is calculated to be similar to a background value.

As shown in FIG. 5, when the PD value is used as a constant value with respect to the whole screen, even an inside of an object is filled with a disparity value of a background unless an increase or a decrease in the disparity occurs in an object boundary. Accordingly, it is impossible to identify the object on a disparity map line.

In particular, when the background of the object is irregular or the object itself is irregular, a cost value may be less than the PD value in a some line of the object boundary. In this case, there occurs a phenomenon that the increase or the decrease in the disparity do not occur in the boundary of the object occurs over a plurality of lines, whereby the object is discontinued on the disparity map.

This also appears as a phenomenon that an end portion of the object such as a head, an end of a hand, and the like of a human being does not appear on the disparity map.

As described above, when using the fixed PD value with respect to the whole screen, the object may not appear on the disparity map in a portion where a difference between the background and the object is small, the object may be discontinued, or an end of the object may not appear.

Accordingly, when determining a body outline of a human being, or when determining a distance from the human being, and a distance from a hand of the human being using the disparity map, a viterbi stereo matching system using the fixed PD value with respect to the whole screen outputs a disparity map that is difficult to be used.

SUMMARY

The present invention has been made in an effort to provide a stereo matching system and method using a dynamic programming scheme that may perform viterbi stereo matching using at least two different penalty of disparity discontinuity (PD) values and synthesize the performed stereo matching results, thereby outputting a disparity map.

An exemplary embodiment of the present invention provides a stereo matching system using a dynamic programming scheme, the system including: an image correction unit to perform an image correction to align scan lines of a left image and a right image; a matching cost calculating unit to calculate a matching cost with respect to the corrected left image and right image; a stereo matching unit to perform viterbi algorithm stereo matching using at least two different PD values with respect to the calculated matching cost, and thereby obtain a plurality of disparity maps according to the PD values; a constraint condition applying unit to invalidate pixels of an occlusion area of each disparity map in the plurality of disparity maps; and a matching result synthesizing unit to synthesize the plurality of disparity maps in which the pixels of the occlusion area are invalidated, and thereby output a synthesized disparity map.

The PD value may be relatively set based on a maximum value of a probable matching cost.

The constraint condition applying unit may invalidate the pixels of the occlusion area of each disparity map by applying a uniqueness constraint condition to the disparity map, and may add 1 to a normal pixel and set an invalidated pixel to 0, in order to identify the invalidated pixels.

The matching result synthesizing unit may synthesize the plurality of disparity maps according to the PD values, and each coordinate value of the synthesized disparity map may take a maximum value from coordinate values of the plurality of disparity maps in which an occlusion is removed.

The matching result synthesizing unit may synthesize the plurality of disparity maps and thereby output the synthesized disparity map, and may output a disparity value of the synthesized disparity map and bits indicating a PD value used for each disparity value.

Another exemplary embodiment of the present invention provides a stereo matching system using a dynamic programming scheme, the system including: an image correction unit to perform an image correction to align scan lines of a left image and a right image; a matching cost calculating unit to calculate a matching cost with respect to the corrected left image and right image, and to aggregate the calculated matching cost; a stereo matching unit to perform viterbi algorithm stereo matching using at least two different PD values with respect to the aggregated matching cost, and thereby obtain a plurality of disparity maps according to the PD values; a constraint condition applying unit to invalidate pixels of an occlusion area of each disparity map in the plurality of disparity maps; and a matching result synthesizing unit to synthesize the plurality of disparity maps in which the pixels of the occlusion area are invalidated, and thereby output a synthesized disparity map.

The matching cost calculating unit may calculate the matching cost with respect to the corrected left image and right image and may aggregate the calculated matching cost using a predetermined size window of a support weight.

Yet another exemplary embodiment of the present invention provides a stereo matching method using a dynamic programming scheme, the method including: performing an image correction to align scan lines of a left image and a right image; calculating a matching cost with respect to the corrected left image and right image; performing viterbi algorithm stereo matching using at least two different PD values with respect to the calculated matching cost to thereby obtain a plurality of disparity maps according to the PD values; invalidating pixels of an occlusion area of each disparity map in the plurality of disparity maps; and synthesizing the plurality of disparity maps in which the pixels of the occlusion area are invalidated to thereby output a synthesized disparity map.

The PD value may be relatively set based on a maximum value of a probable matching cost.

The invalidating may invalidate the pixels of the occlusion area of each disparity map by applying a sole constraint condition to the disparity map, and may add 1 to a normal pixel and set an invalidated pixel to 0, in order to identify the invalidated pixels.

The outputting may synthesize the plurality of disparity maps according to the PD values, and each coordinate value of the synthesized disparity map may take a maximum value from coordinate values of the plurality of disparity maps in which an occlusion is removed.

The outputting may synthesize the plurality of disparity maps and thereby output the synthesized disparity map, and may output a disparity value of the synthesized disparity map and a bit indicating a PD value used for each disparity value.

Still another exemplary embodiment of the present invention provides a stereo matching method using a dynamic programming scheme, the method including: performing an image correction to align scan lines of a left image and a right image; calculating a matching cost with respect to the corrected left image and right image, and aggregating the calculated matching cost; performing viterbi algorithm stereo matching using at least two different PD values with respect to the aggregated matching cost, to thereby obtain a plurality of disparity maps according to the PD values; invalidating pixels of an occlusion area of each disparity map in the plurality of disparity maps; and synthesizing the plurality of disparity maps in which the pixels of the occlusion area are invalidated to thereby output a synthesized disparity map.

The aggregating may aggregate the calculated matching cost using a predetermined size window of a support weight.

According to exemplary embodiments of the present invention, it is possible to accurately detect a boundary of an object by performing viterbi stereo matching using at least two different PD values and synthesizing the performed stereo matching results, to thereby output a disparity map.

According to exemplary embodiments of the present invention, since a boundary of an object is accurately detected, it is possible to prevent discontinuity of the object and an end disappearance of the object, thereby outputting a very detailed disparity map.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
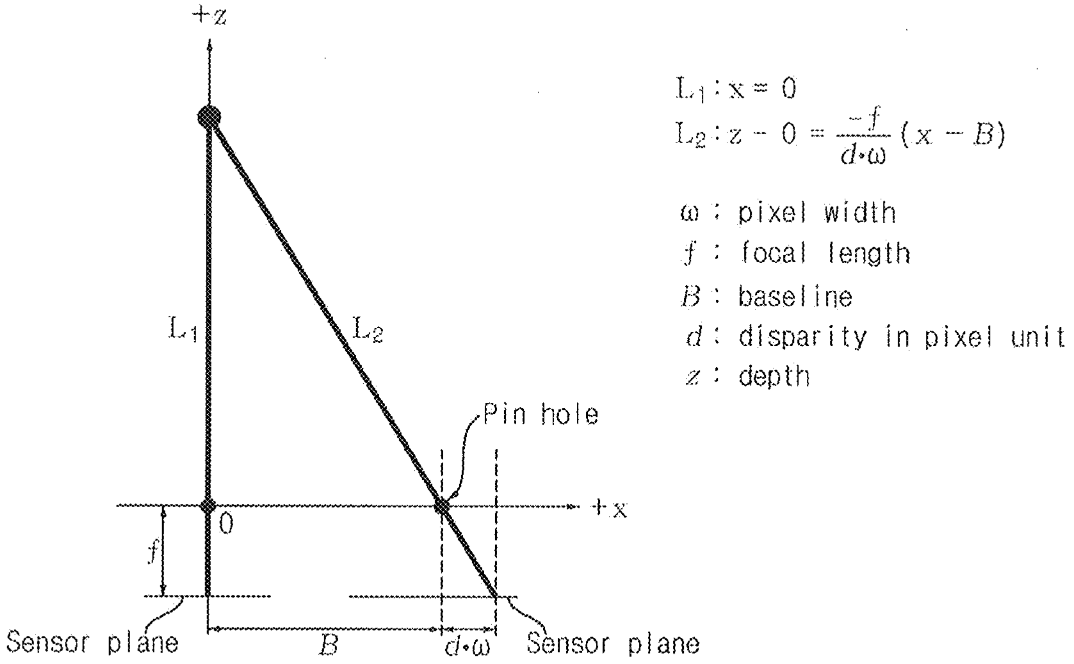
FIG. 1 is an example diagram to describe a binocular disparity in a general stereo camera according to the conventional art.
Figure 2:
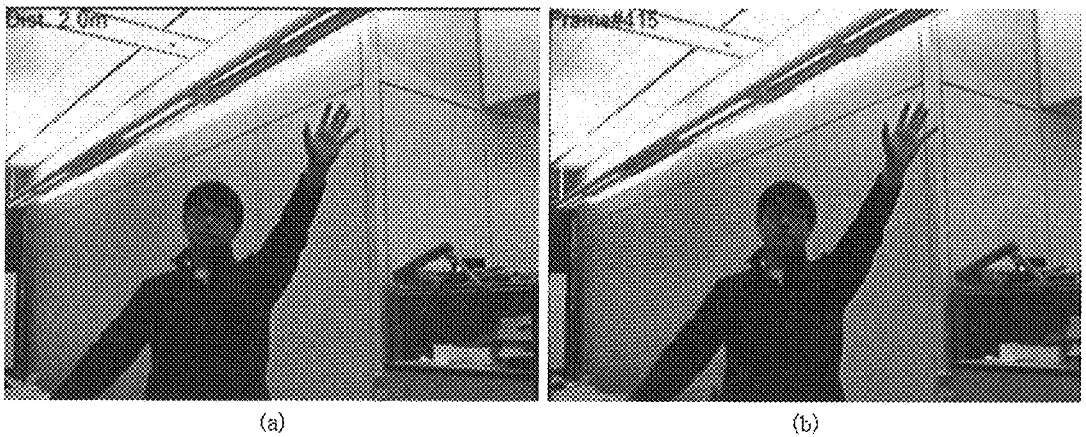
FIG. 2 is an example color diagram illustrating a stereo image obtained using the cameras of FIG. 1.
Figure 3:
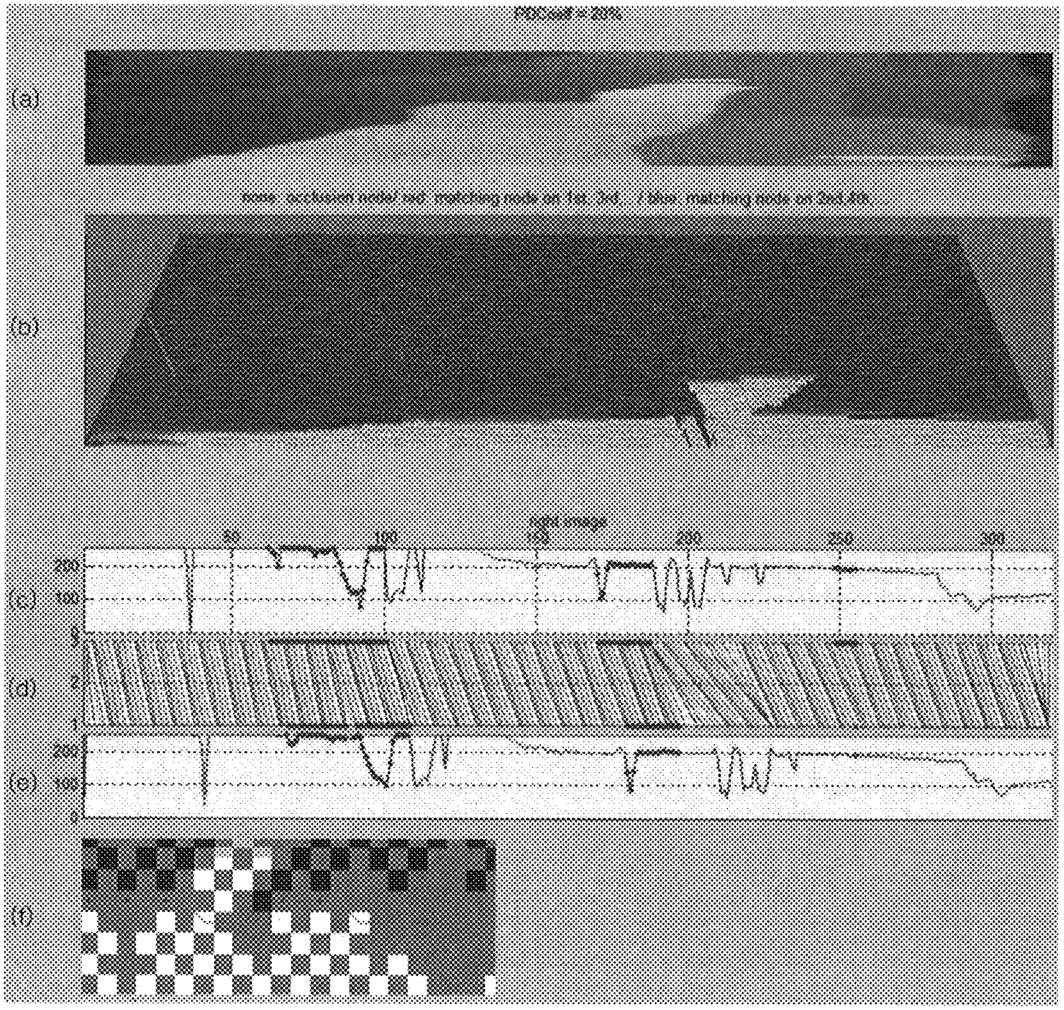
FIG. 3 is a first example color diagram to describe a change in a disparity map according to a magnitude of a PD value according to the prior art.
Figure 4:
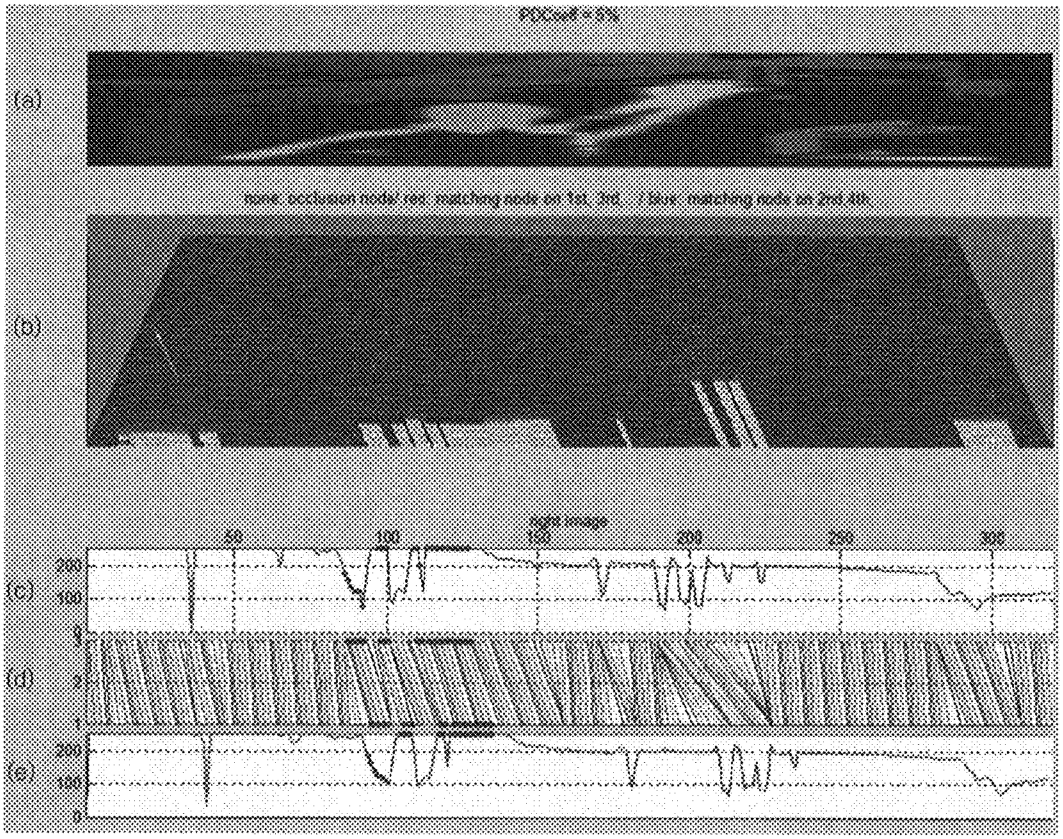
FIG. 4 is a second example color diagram to describe a change in a disparity map according to a magnitude of a PD value according to the prior art.
Figure 5:
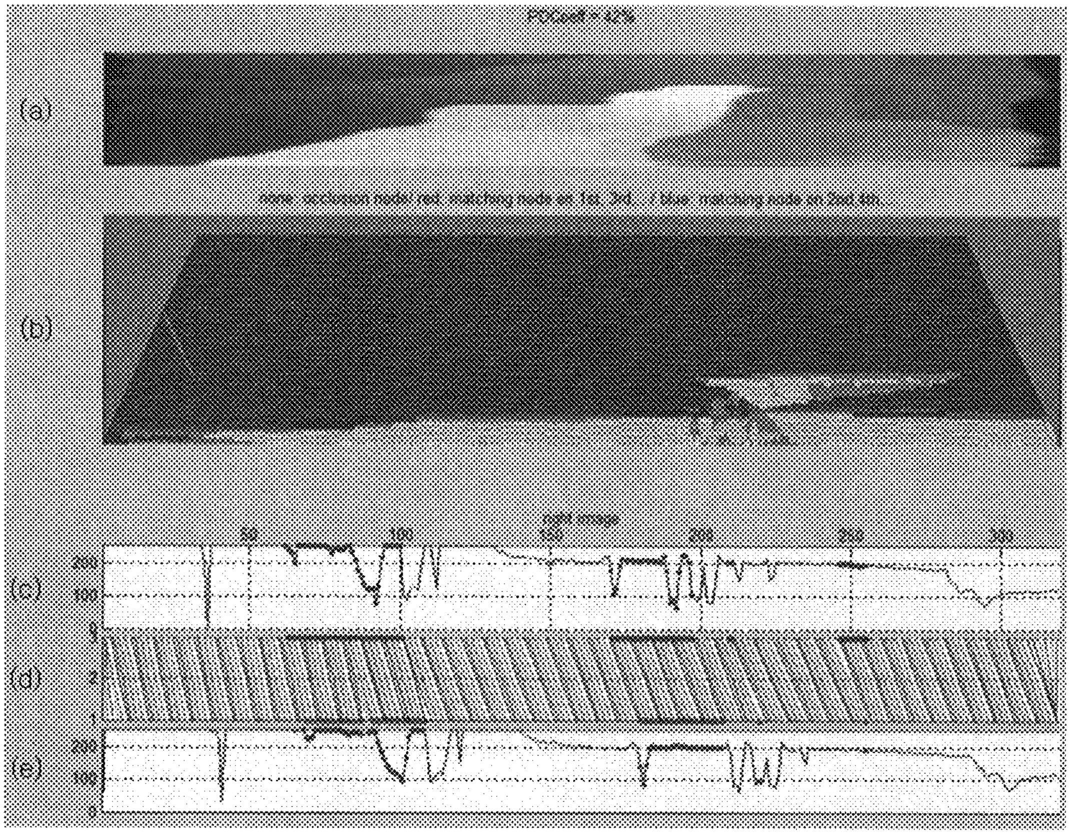
FIG. 5 is a third example color diagram to describe a change in a disparity map according to a magnitude of a PD value according to the prior art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, a stereo matching system and method using a dynamic programming scheme according to an exemplary embodiment of the present invention will be described with reference to FIGS. 6 to 10. Descriptions will be made in detail based on a portion required to understand an operation and a function according to the present invention.

That is, the present invention proposes a method that may perform viterbi stereo matching using at least two different penalty of disparity discontinuity (PD) values and synthesize the performed stereo matching results, thereby outputting a disparity map.

Figure 6:
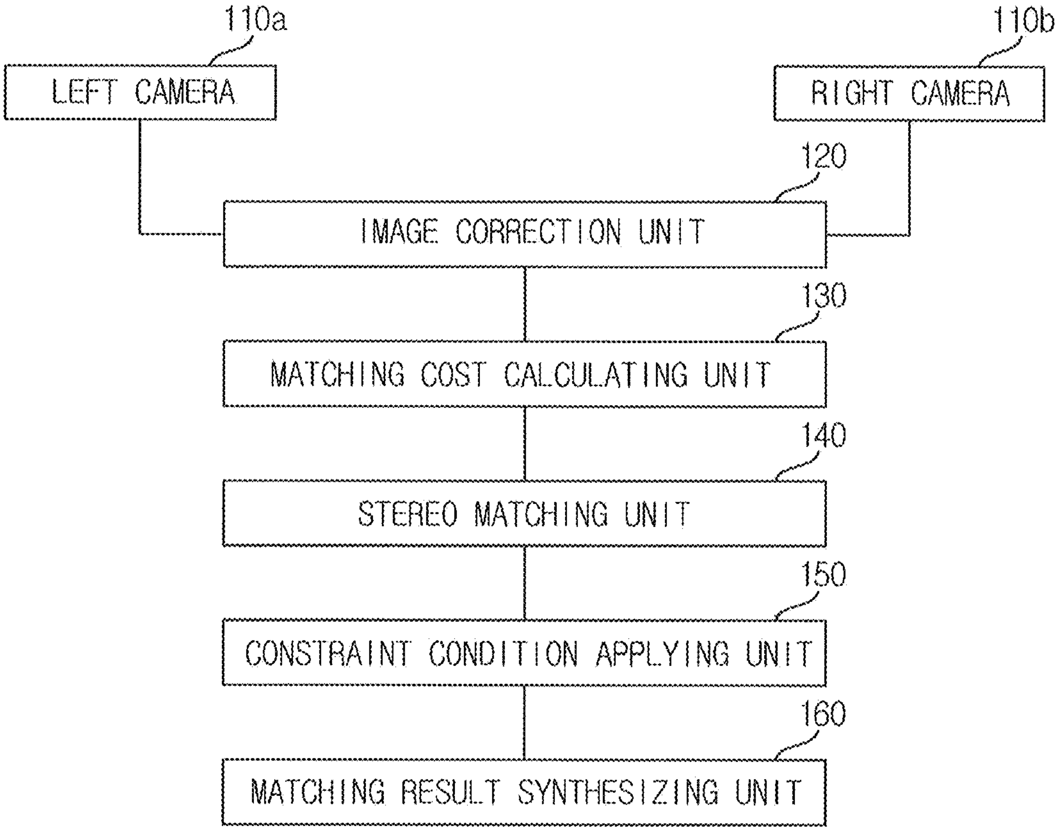
FIG. 6 is an example diagram illustrating a stereo matching system according to an exemplary embodiment of the present invention.

FIG. 6 is an example diagram illustrating a stereo matching system according to an exemplary embodiment of the present invention.

As shown in FIG. 6, the stereo matching system according to the present invention may include a left camera 110*a*, a right camera 110*b*, an image correction unit 120, a matching cost calculating unit 130, a stereo matching unit 140, a constraint condition applying unit 150, and a matching result synthesizing unit 160.

The left camera 110*a* and the right camera 110*b* acquire a stereo image. That is, the left camera 110*a* acquires an image from the left and the right camera 110*b* acquires the image from the right.

The image correction unit 120 aligns the stereo image, that is, a left image and a right image, and performs image correction in order to align scan lines of the left image and the right image. Here, the image correction unit 120 performs the image correction using a parameter that is predetermined based on an un-matching level of alignment.

The matching cost calculating unit 130 calculates a matching cost with respect to the corrected stereo image. Calculation of the matching cost is to calculate a similarity between pixels in order to find a corresponding portion from the left image and the right image. The matching cost may be calculated using a plurality of methods.

The matching cost calculating unit 130 may aggregate the matching cost, calculated using one of the plurality of methods, using a predetermined size window of a support weight.

The stereo matching unit 140 performs viterbi algorithm stereo matching using at least two different PD values with respect to the matching cost, thereby obtaining a disparity map according to each PD value.

Here, when a cost of a path in which each disparity increases is the same as a cost of a path in which each disparity decreases, the viterbi algorithm used in the present invention selects a path in which a lower disparity is selected.

The constraint condition applying unit 150 invalidates pixels of an occlusion area of each disparity map by applying a sole constraint condition to the disparity map. That is, when a plurality of pixels is matched to a single pixel of a raw image, the constraint condition applying unit 150 invalidates remaining pixels excluding only the single pixel.

Here, the constraint condition applying unit 150 may perform processing to identify the invalidated pixels in a disparity map. For example, the constraint condition applying unit 150 may add 1 to a normal disparity pixel and set an invalidated disparity pixel to 0.

The matching result synthesizing unit 160 synthesizes at least two disparity maps according to the different PD values and thereby outputs the synthesized disparity map. That is, the matching result synthesizing unit 160 may allocate each disparity map to a different color channel. For example, the matching result synthesizing unit 160 outputs a red, green, and blue (RGB) image by allocating, to a red channel, a disparity map according to a first PD value, allocating, to a green channel, a disparity map according to a second PD value, and allocating, to a blue channel, a disparity map according to a third PD value.

Figure 7:
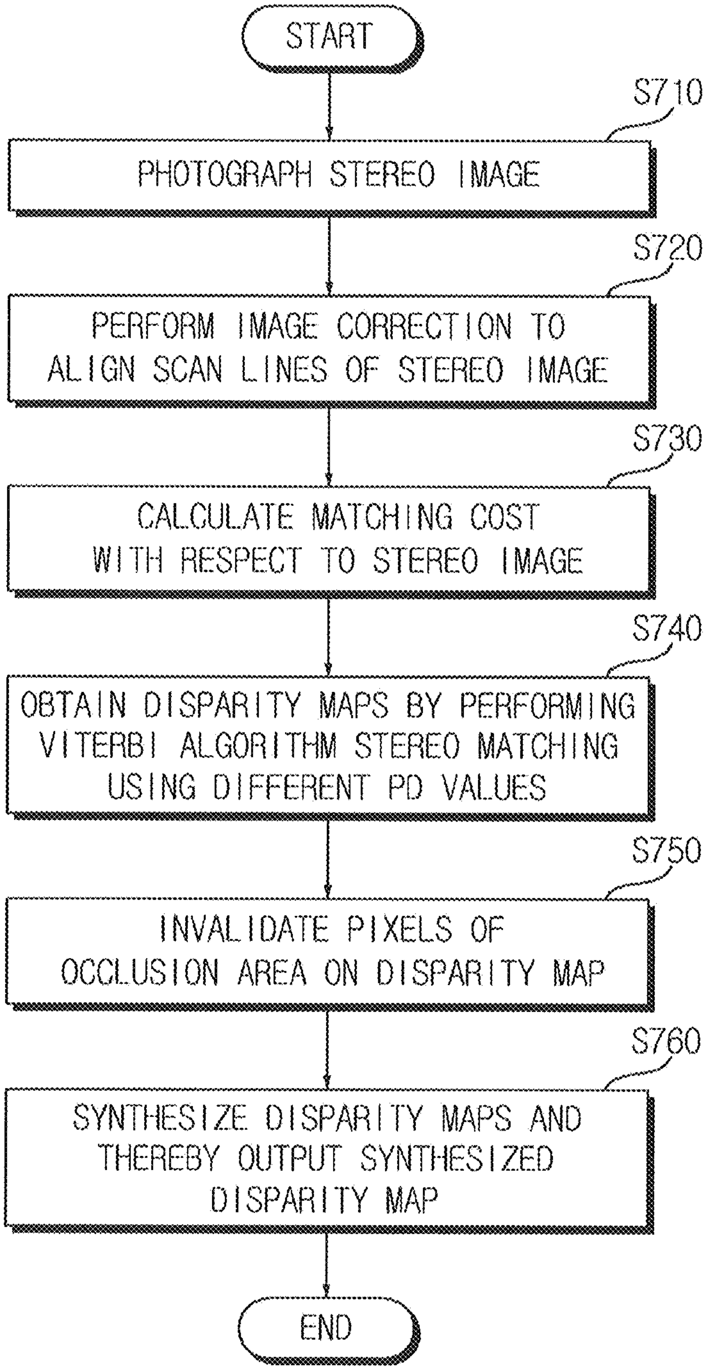
FIG. 7 is a flowchart illustrating a stereo matching method according to an exemplary embodiment of the present invention.

FIG. 7 is a flowchart illustrating a stereo matching method according to an exemplary embodiment of the present invention.

As shown in FIG. 7, a stereo matching system according to the present invention photographs a stereo image using a left camera and a right camera (S710), and performs image correction to align scan lines of the photographed stereo image, that is, the left image and the right image (S720).

Next, the stereo matching system calculates a matching cost with respect to the corrected stereo image (S730). Various calculation methods may be employed to calculate the matching cost. A probable maximum matching cost may be different for each calculation method and a PD value of a viterbi algorithm may be differently set based on the maximum matching cost. It will be further described as below by examples:

1) An absolute difference (AD) scheme calculates the matching cost according to the following Equation 1:

$$cost=|Y_L-Y_R| \quad \text{[Equation 1]}$$

Here, $Y_L$ denotes a brightness value of the left image and $Y_R$ denotes a brightness value of the right image.

In this instance, the PD value is relatively set based on a maximum value of a probable cost.

The maximum value of the probable cost with respect to 0~255 scaled Y is max_cost=255 and thus, the PD value is set such that $PD_{5\%}=255\times5/100$, $PD_{10\%}=255\times10/100$, and $PD_{20\%}=255\times20/100$.

2) A squared difference (SD) scheme calculates the matching cost according to the following Equation 2:

$$cost=(Y_L-Y_R)^2 \quad \text{[Equation 2]}$$

The maximum value of the probable cost with respect to 0~255 scaled Y is max_cost=$255^2$ and thus, the PD value is set such that $PD_{5\%}=255^2\times5/100$, $PD_{10\%}=255^2\times10/100$, and $PD_{20\%}=255^2\times20/100$.

3) 15×15 census transform (CT)+hamming distance cost scheme calculates the matching cost according to the following Equation 3:

$$cost=\text{the number of ones in (bitwiseXOR}(CT(Y_L),CT(Y_R))) \quad \text{[Equation 3]}$$

Here, $CT(Y_L)$ denotes a census transform of the brightness value of the left image and $CT(Y_R)$ denotes a census transform of the brightness value of the right image.

The maximum value of the probable cost with respect to Y is max_cost=the length of a bit string($CT(Y_L)$)=15×15−1=224 and thus, the PD value is set such that $PD_{5\%}=224\times5/100$, $PD_{10\%}=224\times10/100$, and $PD_{20\%}=224\times20/100$.

4) 15×15 modified census transform (MCT)+hamming distance cost scheme calculates the matching cost according to the following Equation 4:

$$cost=\text{the number of ones in (bitwiseXOR}(MCT(Y_L),MCT(Y_R))) \quad \text{[Equation 4]}$$

The maximum value of the probable cost with respect to Y is max_cost=the length of a bit string(MCT(YL))=15×15=225 and thus, the PD value is set such that $PD_{5\%}=225\times5/100$, $PD_{10\%}=225\times10/100$, and $PD_{20\%}=225\times20/100$.

Here, to reduce the affect of noise, the stereo matching system may aggregate the matching cost, calculated using one of the above schemes, using a predetermined size window of a support weight.

Next, the stereo matching system obtains disparity maps $D_{5\%}$, $D_{10\%}$, and $D_{20\%}$ by performing viterbi algorithm stereo matching using three different PD values, for example, $PD_{5\%}$, $PD_{10\%}$, and $PD_{20\%}$ with respect to the matching cost (S740).

Next, the stereo matching system invalidates pixels of an occlusion area of each disparity map by applying a sole constraint condition to the above obtained disparity maps $D_{5\%}$, $D_{10\%}$, and $D_{20\%}$ (S750).

Figure 8:
FIG. 8 is an example diagram illustrating a result of invalidating pixels of an occlusion area according to an exemplary embodiment of the present invention.
Figure 8:
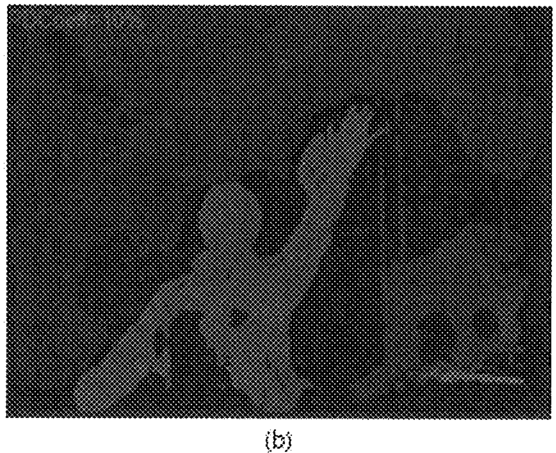
Figure 8:
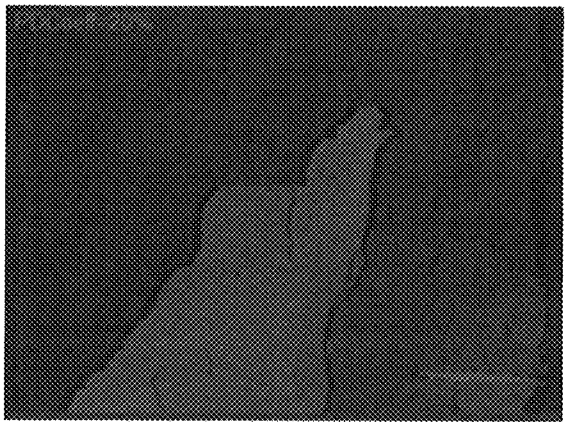

FIG. 8 is an example diagram illustrating a result of invalidating pixels of an occlusion area according to an exemplary embodiment of the present invention. Like the above example, FIG. 8 shows a result of adding 1 to a normal disparity pixel and setting an invalidated disparity pixel to 0 (black).

As shown in FIG. 8, a picture (a) shows a result of invalidating pixels of an occlusion area in $D_{5\%}$, a picture (b) shows a result of invalidating the pixels of the occlusion area in $D_{10\%}$, and a picture (c) shows a result of invalidating the pixels of the occlusion area in $D_{20\%}$.

Next, the stereo matching system synthesizes disparity maps according to the three different PD values and thereby outputs the synthesized disparity map (S760).

Figure 9:
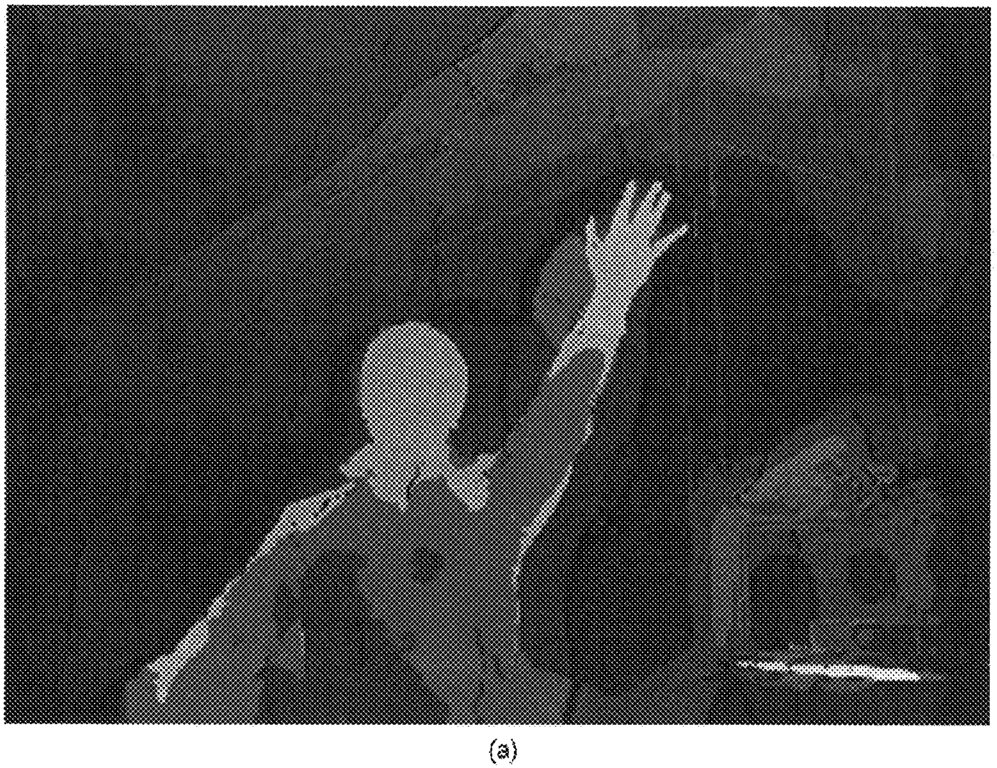
FIG. 9 is an example color diagram illustrating an image of a synthesized disparity map according to an exemplary embodiment of the present invention.

FIG. 9 is an example color diagram illustrating an image of a synthesized disparity map according to an exemplary embodiment of the present invention.

As shown in FIG. 9, a picture (a) shows an example of outputting an RGB image by allocating $D_{5\%}(y,x)$ to a red channel, allocating $D_{10\%}(y,x)$ to a green channel, and allocating $D_{20\%}(y,x)$ to a blue channel.

Table (b) shows a 24-bit data structure of the output RGB image.

Figure 10:
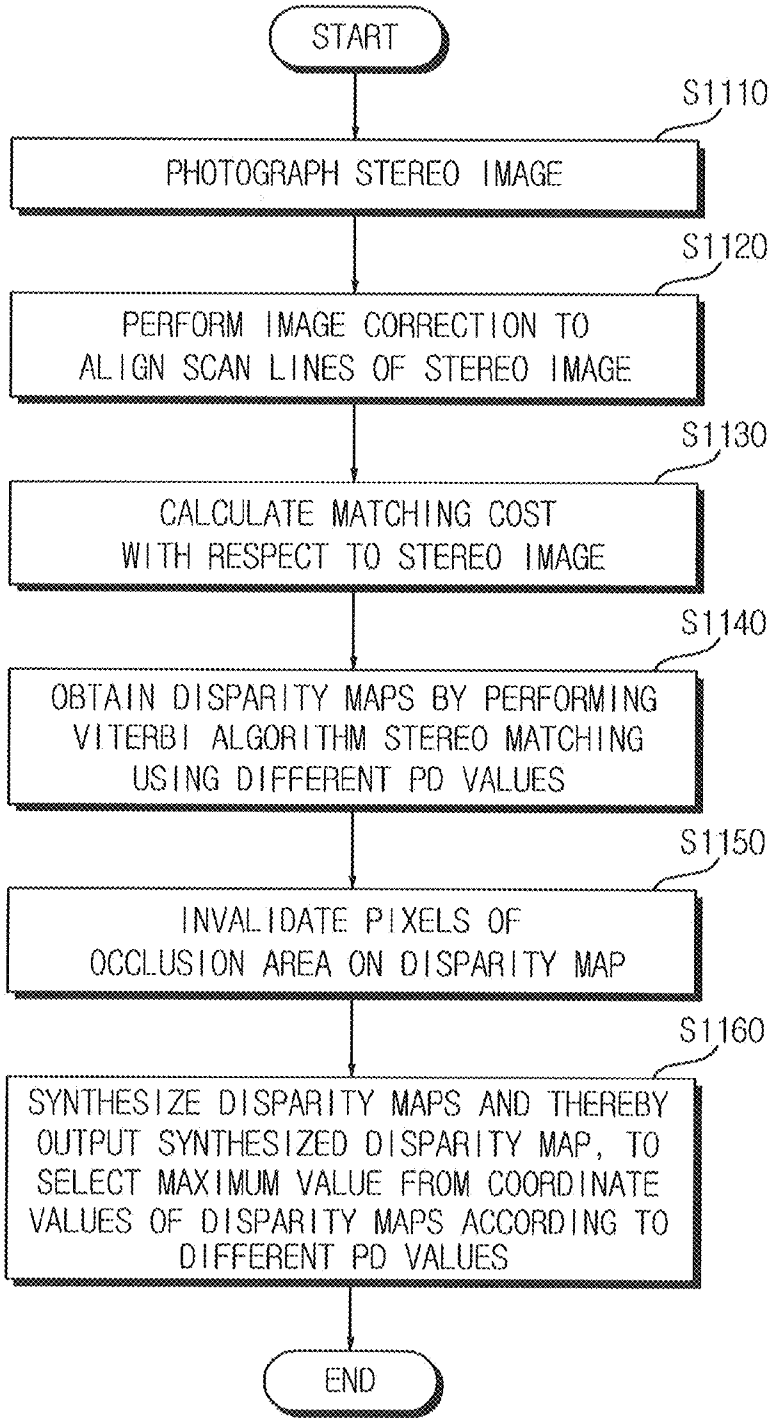
FIG. 10 is a flowchart illustrating a stereo matching method according to another exemplary embodiment of the present invention.

FIG. 10 is a flowchart illustrating a stereo matching method according to another exemplary embodiment of the present invention.

As shown in FIG. 10, a stereo matching system according to the present invention photographs a stereo image using a left camera and a right camera (S1110), and performs image correction to align scan lines of the photographed stereo image, that is, the left image and the right image (S1120).

Next, the stereo matching system calculates a matching cost with respect to the corrected stereo image (S1130).

Here, the stereo matching system may aggregate the matching cost, calculated using any one of the above schemes, using a predetermined size window of a support weight.

Next, the stereo matching system obtains disparity maps $D_{5\%}$, $D_{10\%}$, and $D_{20\%}$ by performing viterbi algorithm stereo matching using three different PD values, for example, $PD_{5\%}$, $PD_{10\%}$, and $PD_{20\%}$ with respect to the matching cost (S1140).

Next, the stereo matching system invalidates pixels of an occlusion area of each disparity map by applying a sole constraint condition to the above obtained disparity maps $D_{5\%}$, $D_{10\%}$, and $D_{20\%}$ (S1150).

Next, the stereo matching system synthesizes disparity maps according to the three different PD values and thereby outputs the synthesized disparity map (S1160). Here, to reduce an information amount, each coordinate value of the synthesized disparity map takes a maximum value from the disparity maps $D_{5\%}(y,x)$, $D_{10\%}(y,x)$, and $D_{20\%}(y,x)$ according to the three different PD values in which the occlusion area is removed.

Hereinafter, it will be further described in detail as below. $D_{5\%}(y,x)$, $D_{10\%}(y,x)$, and $D_{20\%}(y,x)$ may be different from each other at (y,x) coordinate.

Referring again to FIG. 9, in a gray series portion, all of $D_{5\%}(y,x)$, $D_{10\%}(y,x)$, and $D_{20\%}(y,x)$ are not an invalid value (0 in the case of the invalid value) and values thereof are at the same position. In a sky-blue series portion, $D_{5\%}(y,x)$ is the invalid value 0 and values of $D_{10\%}(y,x)$ and $D_{20\%}(y,x)$ are at the same position. In a blue series portion, $D_{5\%}(y,x)$ and $D_{10\%}(y,x)$ are the invalid value 0 and $D_{20\%}(y,x)$ have a value greater than the invalid value 0.

Although not shown in the picture (a) of FIG. 9, the disparity increases like $D_{5\%}(y,x)$ when the PD value is small. When the PD value is great, the disparity like $D_{20\%}(y,x)$ is less than $D_{5\%}(y,x)$. This corresponds to a case where disparity of a background invades an inside of an object, whereby discontinuity of the object occurs.

Accordingly, a disparity value at one of coordinates (y, x) takes the maximum value from $D_{5\%}(y,x)$, $D_{10\%}(y,x)$, and $D_{20\%}(y,x)$ in which the occlusion is removed. Next, information regarding from which PD value the maximum value is taken is output.

That is, for example, an information amount per pixel may be reduced to 15 bits by allocating a source flag of each single bit per PD value, that is, three bits behind disparity values as shown in the following Table 1, and setting 1 when a value is taken from a corresponding PD value, or otherwise setting 0.

TABLE 1

| Disparity value = Max ($D_{5\%}$(y, x), $D_{10\%}$(y, x), $D_{20\%}$(y, x)) | | | | | | | | | | | | | Source flag | | |
|---|---|---|---|---|---|---|---|---|---|---|---|---|---|---|---|
| b12 | b22 | b10 | b9 | b8 | b7 | b6 | b5 | b4 | b3 | b2 | b1 | b0 | $PD_{5\%}$ | $PD_{10\%}$ | $PD_{20\%}$ |

An application using the disparity map generated as above may treat disparity in which all of the source flags are filled, as disparity of an actual object. For example, in the source flags of the above order, when a most significant bit (MSB) side is 1 and a least significant bit (LSB) side is 0, it may be determined as a discontinuity area of the object occurring due to invasion of the disparity of the background. When the MSB side is 0 and the LSB side is 1, it may be determined as a background occluded by left and right objects.

As described above, the present invention may output a disparity map by performing viterbi stereo matching using at least two different PD values and synthesizing the performed stereo matching results, thereby making it possible to accurately detect a boundary of an object and to prevent discontinuity of the object and an end disappearance of the object. Accordingly, the present invention may output a very detailed disparity map.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A stereo matching system using a dynamic programming scheme, the system comprising:
- an image correction unit to perform an image correction to align scan lines of a left image and a right image;
- a matching cost calculating unit to calculate a matching cost with respect to the corrected left image and right image;
- a stereo matching unit to perform viterbi algorithm stereo matching using at least two different penalty of disparity discontinuity (PD) values with respect to the calculated matching cost, and thereby obtain a plurality of disparity maps according to the PD values;
- a constraint condition applying unit to invalidate pixels of an occlusion area of each disparity map in the plurality of disparity maps; and
- a matching result synthesizing unit to synthesize the plurality of disparity maps in which the pixels of the occlusion area are invalidated, and thereby output a synthesized disparity map.

2. The system of claim 1, wherein the PD value is relatively set based on a maximum value of a probable matching cost.

3. The system of claim 1, wherein the constraint condition applying unit invalidates the pixels of the occlusion area of each disparity map by applying a sole constraint condition to the disparity map, and adds 1 to a normal pixel and sets an invalidated pixel to 0, in order to identify the invalidated pixels.

4. The system of claim 1, wherein the matching result synthesizing unit synthesizes the plurality of disparity maps according to the PD values, and each coordinate value of the synthesized disparity map takes a maximum value from coordinate values of the plurality of disparity maps in which an occlusion is removed.

5. The system of claim 1, wherein the matching result synthesizing unit synthesizes the plurality of disparity maps and thereby outputs the synthesized disparity map, and outputs a disparity value of the synthesized disparity map and a bit indicating a PD value used for each disparity value.

6. A stereo matching system using a dynamic programming scheme, the system comprising:
- an image correction unit to perform an image correction to align scan lines of a left image and a right image;
- a matching cost calculating unit to calculate a matching cost with respect to the corrected left image and right image, and to aggregate the calculated matching cost;
- a stereo matching unit to perform viterbi algorithm stereo matching using at least two different PD values with respect to the aggregated matching cost, and thereby obtain a plurality of disparity maps according to the PD values;
- a constraint condition applying unit to invalidate pixels of an occlusion area of each disparity map in the plurality of disparity maps; and
- a matching result synthesizing unit to synthesize the plurality of disparity maps in which the pixels of the occlusion area are invalidated, and thereby output a synthesized disparity map.

7. The system of claim 6, wherein the matching cost calculating unit calculates the matching cost with respect to the corrected left image and right image and aggregates the calculated matching cost using a predetermined size window of a support weight.

8. A stereo matching method using a dynamic programming scheme, the method comprising:

performing an image correction to align scan lines of a left image and a right image;

calculating a matching cost with respect to the corrected left image and right image;

performing viterbi algorithm stereo matching using at least two different PD values with respect to the calculated matching cost to thereby obtain a plurality of disparity maps according to the PD values;

invalidating pixels of an occlusion area of each disparity map in the plurality of disparity maps; and synthesizing the plurality of disparity maps in which the pixels of the occlusion area are invalidated to thereby output a synthesized disparity map.

9. The method of claim 8, wherein the PD value is relatively set based on a maximum value of a probable matching cost.

10. The method of claim 8, wherein the invalidating invalidates the pixels of the occlusion area of each disparity map by applying a sole constraint condition to the disparity map, and adds 1 to a normal pixel and sets an invalidated pixel to 0, in order to identify the invalidated pixels.

11. The method of claim 8, wherein the outputting synthesizes the plurality of disparity maps according to the PD values, and each coordinate value of the synthesized disparity map takes a maximum value from coordinate values of the plurality of disparity maps in which an occlusion is removed.

12. The method of claim 11, wherein the outputting synthesizes the plurality of disparity maps and thereby outputs the synthesized disparity map, and outputs a disparity value of the synthesized disparity map and a bit indicating a PD value used for each disparity value.

13. A stereo matching method using a dynamic programming scheme, the method comprising:

performing an image correction to align scan lines of a left image and a right image;

calculating a matching cost with respect to the corrected left image and right image, and aggregating the calculated matching cost;

performing viterbi algorithm stereo matching using at least two different PD values with respect to the aggregated matching cost, to thereby obtain a plurality of disparity maps according to the PD values;

invalidating pixels of an occlusion area of each disparity map in the plurality of disparity maps; and synthesizing the plurality of disparity maps in which the pixels of the occlusion area are invalidated to thereby output a synthesized disparity map.

14. The method of claim 13, wherein the aggregating aggregates the calculated matching cost using a predetermined size window of a support weight.

* * * * *